March 19, 1957     B. L. MIMS     2,785,566
ROLLING QUALITY TESTER FOR ROLLING BEARINGS
Filed March 15, 1954     2 Sheets-Sheet 1

INVENTOR.
BRUCE L. MIMS
BY
ATTORNEY

United States Patent Office 2,785,566
Patented Mar. 19, 1957

2,785,566

ROLLING QUALITY TESTER FOR ROLLING BEARINGS

Bruce L. Mims, Danbury, Conn., assignor to The Barden Corporation, Danbury, Conn., a corporation of Connecticut Application March 15, 1954, Serial No. 416,046

7 Claims. (Cl. 73—9)

My invention relates to a rolling quality tester for rolling bearings and more particularly to an instrument for measuring the rolling friction, as well as the lack of uniformity of rolling friction, in bearing elements.

In the manufacture of rolling bearings it has long been customary to measure the various diameters of the rolling elements with great precision. Two-point and three-point measurements are sometimes made with gradings for size and roundness to as close as 0.000005 inch. Even such carefully graded elements do not, however, consistently result in bearings having the required low friction and low vibration. Inconsistencies in results have occurred with sufficient frequency to indicate that some factor other than the diameter of the rolling element is dominant.

A significant portion of the total friction in a bearing is due to the rolling friction of the rolling elements. Because of mutual deformations of mating surfaces, some rolling friction is always present when bearing elements are under loads normal to their contacting areas. I have found that, to a large extent, satisfactory performance depends on the uniformity of the rolling friction between bearing elements as the elements roll together. Irregularities in the contacting surfaces of the elements produce nonuniform rolling friction. This nonuniformity results in bearings which do not have the required low vibration and low friction in operation. It is the dominant factor to be measured in evaluating the quality of a rolling element.

The rolling friction between bearing elements is largely dependent upon departures of the surfaces of the elements, such as balls, needles, rollers, or tapered rollers, from truly spherical, truly cylindrical, or truly conical surfaces. These surface departures may be so minute that they cannot conveniently be evaluated by existing gauges. For example, small scratches or nearly imperceptible flats may appreciably affect the rolling friction of the bearing. I have invented an instrument for measuring the rolling friction of rolling bearing elements. My instrument, moreover, measures the lack of uniformity of the rolling friction of the bearing elements.

One object of my invention is to produce a rolling quality tester for rolling bearings which measures the rolling friction of bearing elements with a high degree of accuracy.

Another object of my invention is to provide a rolling quality tester for rolling bearings which measures the lack of uniformity of rolling friction of bearing elements.

Other and further objects of my invention will appear from the following description.

In general, my invention contemplates the provision of a pair of hard, smooth surfaces between which a number of bearing elements to be tested are placed. These surfaces may be provided by optically flat glass, polished steel disks, polished grooved disks, polished conical disks, or other means providing nearly true surfaces. The first surface is carried by a motor-driven spindle. The second surface is carried by a cap member. A number of bearing elements, the rolling friction of which is to be measured, are sandwiched between the surfaces thus carried and mounted. The cap member carrying the second of the two surfaces is prevented from rotating by a torque arm arranged to exert a force on the sensing arm of a transducer. When the spindle carrying the first of the surfaces is rotated, the elements under test roll between the two surfaces. As a consequence of this rolling, the cap member carrying the second surface actuates the torque arm to exert a force on the sensing element of the transducer. This force is proportional to the rolling friction of the assembly. The transducer, consequently, generates an electrical signal proportional to this force. This signal may be amplified and applied to a suitable recorder. Arbitrary acceptance standards dependent on the character of the trace are set up as a measure of the rolling quality of the elements under test. Means is provided for reversing the direction of rotation of the spindle after one revolution of an element around the surfaces to produce a measure of the rolling friction of the assembly, as will be explained hereinafter.

In the accompanying drawings which form part of the instant specification and which are to be read in conjunction therewith and in which like reference numerals are used to indicate like parts in the various views.

Figure 1:
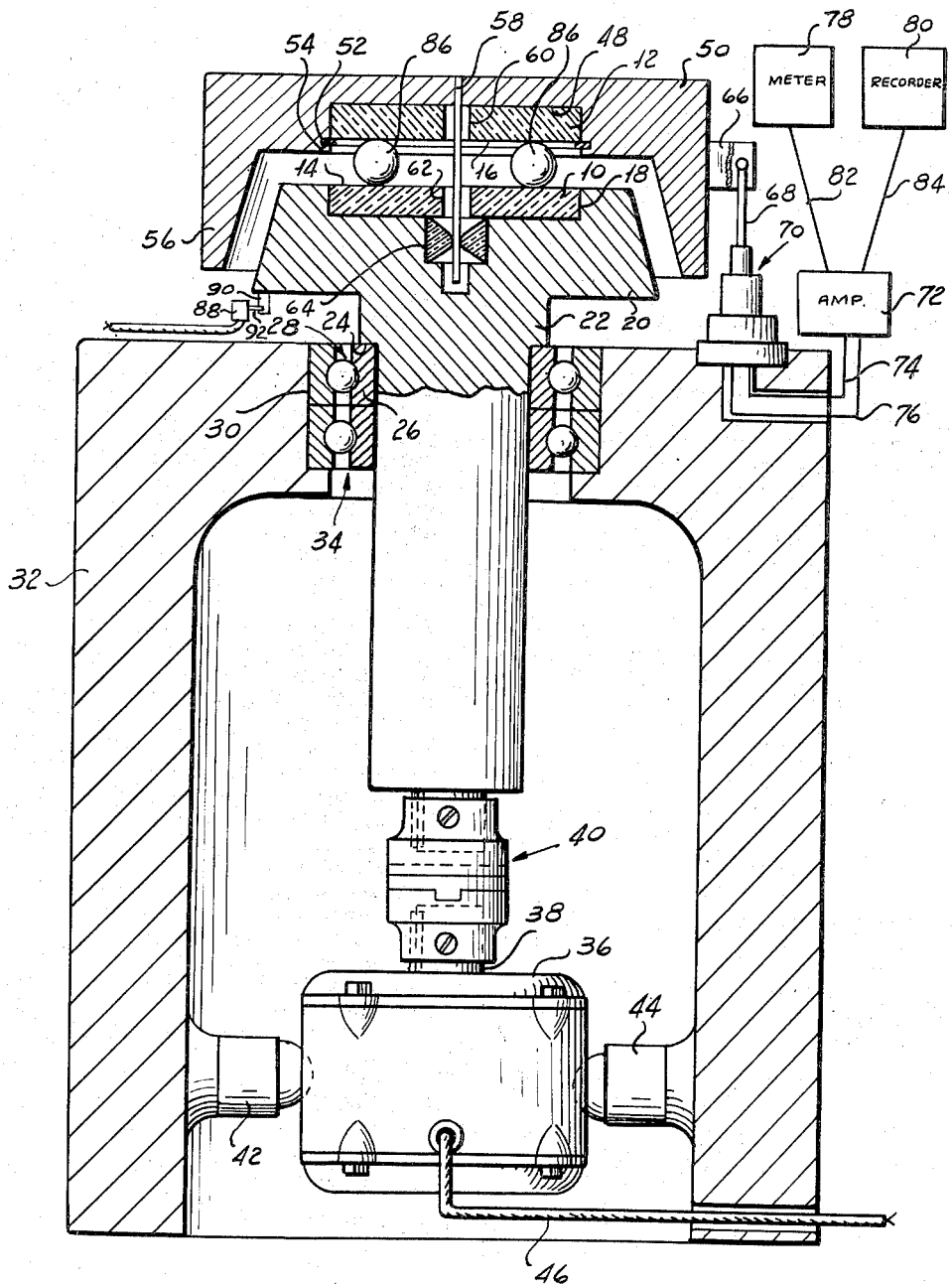
Figure 1 shows a sectional elevation of my rolling quality tester for rolling bearings.

More particularly referring now to the drawings, my rolling quality tester includes a pair of members 10 and 12 providing respective nearly true surfaces 14 and 16. These members 10 and 12 may be any convenient means providing surfaces 14 and 16. For example, they may be optically flat glass, polished disks of steel or any other suitable hard material, polished grooved plates, or polished cones. As a matter of fact, if the material of which the members 10 and 12 are formed is varied, the rolling friction of various materials may be determined by using standard rolling elements. The member 10 providing the first surface 14 is disposed in a recess 18 formed in a head 20 of a rotatably mounted spindle 22. Spindle 22 is formed with a shoulder 24 by means of which it is carried on the inner race 26 of a ball bearing, indicated generally by the reference character 28. The outer race 30 of the ball bearing 28 is supported in a hollow standard 32. Conveniently, I may employ a second ball bearing, indicated generally by the reference character 34, for supporting the spindle 22. Spindle 22 is adapted to be driven by a motor 36, the shaft 38 of which is connected to the spindle by a flexible coupling, such, for example, as an Oldham coupling, indicated generally by the reference character 40. Motor 36 is supported within the standard 32 on a pair of shock-absorbing supports 42 and 44 of any appropriate construction. Electrical power may be supplied to motor 36 from any convenient source (not shown) by a cable 46. It will readily be appreciated that when motor 36 is energized, its shaft 38 drives the spindle 22 through the flexible coupling 40. The lower member 10 providing the surface 14 preferably is disposed in a horizontal plane. This disposition is desirable in order that the lateral or sidewise loading of the device be negligible. It will be appreciated that the provision of a pair of bearings 28 and 34 aids in maintaining spindle 22 along a vertical axis and thereby maintains the surface 14 horizontal.

The member 12 providing the upper surface 16 is mounted in a recess 48 formed in a cap member 50. The member 12 is retained in the recess 48 by any appropriate means such as a snap ring 52 which cooperates with an annular recess 54 formed in the recess 48. The cap member 50 is formed with an annular depending flange 56 which substantially surrounds the head 20 on the spindle 22.

A guide pin 58 fixed in the center of the member 50 is provided to maintain the axial alignment of the elements 10 and 12. Member 58 passes through a hole 60 at the center of member 12, through a hole 62 in the center of the member 10, into a jewel bearing 64 carried by the head 20 below the recess 18. The upper surface 16 is on a plane determined by the bearing elements under test but will be nearly horizontal. It will readily be appreciated that because of the horizontal disposition of the surface 14 and the nearly horizontal disposition of the surface 16, the friction contributed by the jeweled bearing 64 will be negligible, since, as mentioned hereinbefore, the sidewise loading of the device is very nearly zero.

In order to detect a torque tending to rotate the cap 50, I mount a bifurcated torque arm 66 on the periphery of the member 50. The arm 66 embraces, engages, and actuates the sensing element 68 of a transducer, indicated generally by the reference character 70, irrespective of the direction of the torque tending to rotate cap 50. Transducer 70 may be of any type known to the art which is adapted to produce an output signal in response to an actuation of its sensing element 68. Conveniently, I apply the output signal from the transducer 70 to an amplifier 72 by means of a pair of conductors 74 and 76. The output signal from the amplifier 72 may energize both a meter 78 and a recorder 80. The electrical connections from the amplifier 72 to the meter 78 and recorder 80 are indicated schematically, respectively, by lines 82 and 84.

A reversing switch 88 is placed in the circuit of motor 36 and, when actuated, reverses the direction of rotation of spindle 22. A projection 90 is formed on the base of spindle head 20 adjacent the periphery thereof in a position to engage the arm 92 of switch 88 to reverse the direction of rotation of spindle 22 at the end of one rotation thereof.

As has been mentioned hereinbefore, the bearing elements being tested are sandwiched between the surfaces 14 and 16 during a test. By way of example, I have indicated ball bearings 86 as the elements under test.

When a test is to be made, the cap 50 may readily be removed by drawing the guide pin 58 out of the bearing 64. A number of elements to be tested are then placed on the surface 14. While any convenient number of elements may be employed, I prefer to measure the rolling friction of three rolling elements spaced 120 degrees apart. In this case, the output from the transducer is the integration of the rolling friction of the three elements. It will be appreciated that if desired a pair of rolling elements of predetermined character may be employed to provide a standard against which a third ball is tested. In this case the output from the transducer represents the rolling quality of the tested ball. When the elements have been so disposed on the surface 14, cap 50 is replaced in a position where the torque arm 66 will actuate the sensing elements 68 of the transducer 70. In order to conduct the test, motor 36 is energized to drive shaft 38 in, for example, a clockwise direction. Shaft 38 drives spindle 22 through the flexible coupling 40 and the lower surface 14 slowly rotates. The arrangement is such that the rolling elements 86 rotate at half the speed of the member 10 and the member 12 exerts a force on the transducer sensing element 68 through cap 50 and torque arm 66. This force is proportional to the rolling friction of the assembly. The transducer generates an electrical signal proportional to the applied force. After amplification by the amplifier 72, the signal passes to the meter 78 and the recorder 80. After the test has proceeded for one revolution of a particular ball in a clockwise direction, projection 90 engages arm 92 of switch 88 to reverse motor 36 and the test continues for a single revolution of a ball in a counterclockwise direction. It will readily be appreciated that if the surfaces of the rolling elements were perfect, the recorder trace in both directions would be a straight line. The reverse rotation of the motor would shift the position of the trace by a distance equal to twice the average friction of the configuration, since torque arm 66 would move the sensing element 68 back to its initial position from the position to which it had been moved before the reversal of motor 36 and then through an equal distance in the opposite direction.

Figure 2:
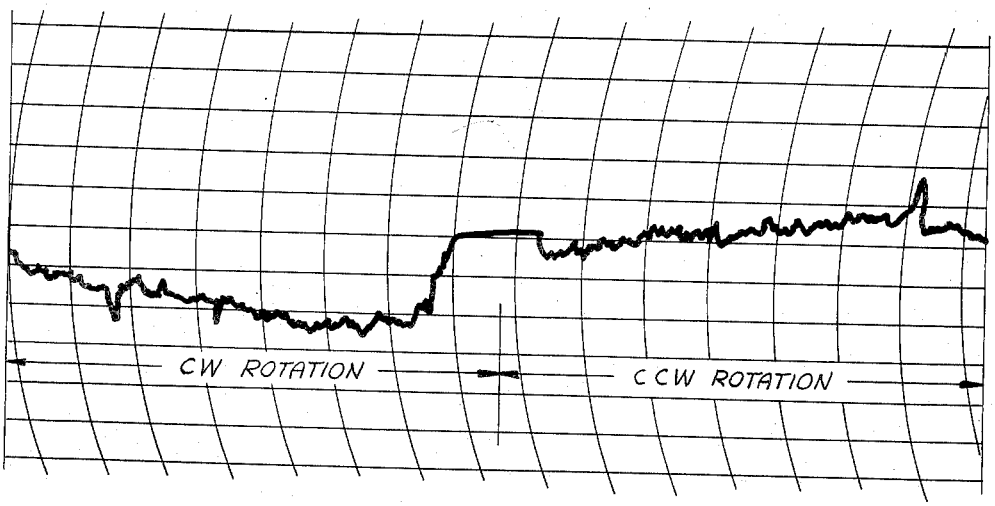
Figure 2 shows the trace resulting when a poor quality rolling element is tested.
Figure 3:
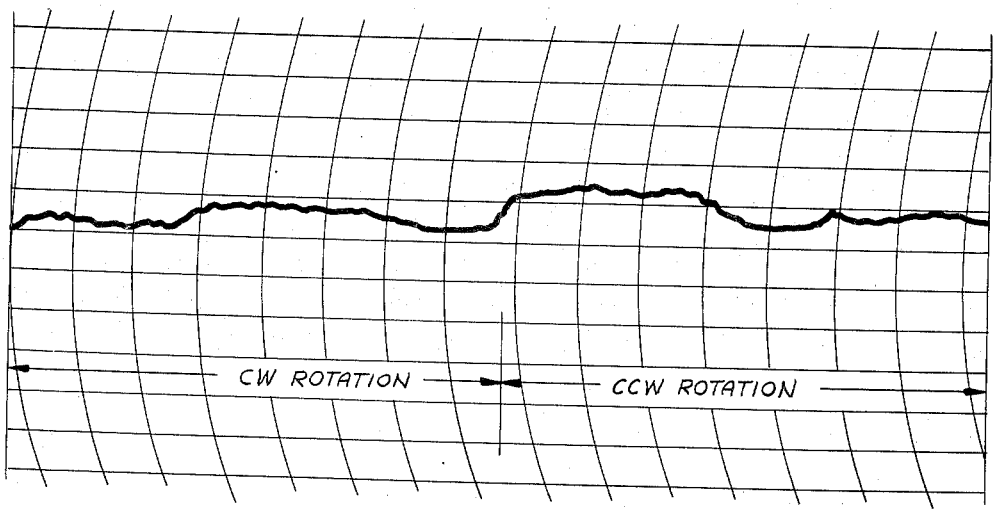
Figure 3 shows the resulting trace when a good quality rolling element is tested.

The rolling elements, of course, are never absolutely perfect, and the trace merely approaches a straight line for high quality bearing elements. For most elements the trace is jagged and asymmetrical. The character of the trace is indicative of the type irregularity present in the bearing surface. For a given lot of bearing elements produced together the quality of any one element of the lot generally is characteristic of all elements of the lot. Consequently, a trace indicating the presence of a bad ball, whether three balls of the lot are tested together or whether a single ball of the lot is tested against balls of the standard quality, generally indicates that all balls of the lot are bad. Different types of traces and portions of the trace may readily be interpreted as indicating flat areas, surface roughness, or out-of-roundness of the bearing element. In Figure 2 I have shown a trace resulting when a poor ball is tested. It is readily apparent that the trace is jagged and asymmetrical. Further, it includes a number of sharp peaks indicating particularly defective spots in the ball. Figure 3 shows the resulting trace when a good ball is being tested. It is relatively smooth and has no sharp peaks. The magnitude of the shift of the trace in a vertical direction upon reversal of the driving motor is a measure of the average friction of the configuration. A comparison of Figures 2 and 3 shows that the shift of the trace of Figure 2 is much greater than that of Figure 3, indicating a greater average friction when the poor ball was being tested than when the good ball was being tested. In order to provide a pass-fail standard, a meter may be employed to indicate the root mean square value of the trace.

In calibrating my recorder I connect a torsion wire between the spindle head 20 and the cap member 50 along the axis of the spindle. The spindle is rotated through a predetermined angle to twist the wire, and the deflection of the recorder is adjusted to a convenient value by means of the amplifier sensitivity control (not shown).

As has been explained hereinbefore, various materials and geometric shapes may be employed to form the surfaces 14 and 16. The rolling characteristics of the various materials may then be determined. If I employ high quality balls of known rolling characteristics, I may readily determine the rolling friction encountered when using various finishing methods on flat disks. The recorder trace then indicates a measure of the quality of the disk surface in terms of rolling friction.

It will be seen that I have accomplished the objects of my invention. I have provided a rolling quality tester for rolling bearings by means of which the rolling quality of rolling bearing elements may be determined with a high degree of accuracy. My instrument indicates whether or not a particular bearing element is within an accepted standard of rolling friction. Moreover, my instrument also indicates the presence of a lack of uniformity of the rolling friction in bearing elements. If desired, my instrument may be employed to investigate the quality of surface provided by flat surfaces by various materials and surface finishes or it may be used to investigate the effect of various groove shapes cut into the polished plates.

It will be understood that various features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A rolling quality tester for rolling bearing elements including in combination respective means providing a pair of surfaces between which an element to be tested is sandwiched, said surfaces being formed with a predetermined trueness to provide a smoothness standard, means for movably mounting said surface providing means, means for moving a first one of said surface providing means with respect to the second surface providing means, and sensing means actuated by the second of said surface providing means to produce a signal proportional to the rolling friction of the assembly.

2. A rolling quality tester for rolling bearing elements including in combination respective means providing a pair of surfaces between which the elements to be tested are sandwiched, said surfaces being formed with a predetermined trueness to provide a smoothness standard, means for movably mounting said surface providing means, means for rotating a first one of said surface providing means, sensing means for detecting the tendency of the second of said surface providing means to rotate, and means associated with said sensing means for producing a signal proportional to the rolling friction of the assembly.

3. A rolling quality tester as in claim 2 wherein said surface providing means are optical flats.

4. A rolling quality tester for rolling bearing elements including in combination means providing a first surface on which the elements to be tested are to be supported, means providing a second surface to be supported on the bearing elements to be tested, said surfaces being formed with a predetermined trueness to provide a smoothness standard, means for rotating the first surface providing means, sensing means for detecting the tendency of the second surface providing means to rotate, means associated with the sensing means for producing a signal proportional to the rolling friction of the assembly and indicating means actuated by said signal.

5. A rolling quality tester as in claim 4 including means for maintaining the axial alignment of the first surface providing means with respect to the second surface providing means.

6. A rolling quality tester as in claim 4 including a torque arm carried by the second surface providing means in which said sensing means includes a transducer having a sensing arm and said sensing arm engages said torque arm.

7. A rolling quality tester for rolling bearing elements including in combination respective means providing a pair of surfaces between which an element to be tested is sandwiched, said surfaces being formed with a predetermined trueness to provide a smoothness standard, means for moving a first one of said surface providing means with respect to the second of said surface providing means, sensing means for substantially restraining the second surface providing means from movement so that the bearing element rolls between the surface providing means, means for reversing said moving means after a predetermined movement of the bearing element, said sensing means adapted to produce a signal proportional to the rolling friction of the assembly and indicating means responsive to said signal to produce a trace providing a measure of the average rolling friction of the element and of the lack of uniformity of the rolling friction of the element.

References Cited in the file of this patent

UNITED STATES PATENTS

| | | |
|---|---|---|
| 2,054,787 | Beavers et al. | Sept. 22, 1936 |
| 2,398,156 | Puterbaugh et al. | Apr. 9, 1946 |
| 2,471,423 | Gisser | May 31, 1949 |

FOREIGN PATENTS

| | | |
|---|---|---|
| 326,049 | Germany | Sept. 22, 1920 |
| 320,614 | Great Britain | Oct. 16, 1929 |